Oct. 23, 1951 L. Z. LA FOREST 2,572,495

PHONOGRAPHIC TRANSLATING DEVICE FOR RECORDING AND REPRODUCING

Filed June 28, 1946 2 SHEETS—SHEET 1

INVENTOR
Louis Z. LaForest
By Harry Lanahan
ATTORNEY

PHONOGRAPHIC TRANSLATING DEVICE FOR RECORDING AND REPRODUCING

Filed June 28, 1946 2 SHEETS--SHEET 2

INVENTOR
Louis Z. LaForest
By Henry Lanahan
ATTORNEY

Patented Oct. 23, 1951 2,572,495

UNITED STATES PATENT OFFICE 2,572,495

PHONOGRAPHIC TRANSLATING DEVICE FOR RECORDING AND REPRODUCING

Louis Z. La Forest, Parsippany-Troy Hills Township, Morris County, N. J., assignor to Thomas A. Edison, Incorporated, West Orange, N. J., a corporation of New Jersey Application June 28, 1946, Serial No. 680,313

6 Claims. (Cl. 274—30)

This invention relates to unitary phonographic translating devices which are adapted for selectively recording on or reproducing from moving records, and more particularly to a novel mountings and control means for the translating units of such devices.

Phonographic translating devices of the combined recording-reproducing type art typically provided with separate recording and reproducing styli and are adjustable so that the styli may be engaged selectively with the record to condition the device selectively for recording or reproducing. As the devices are shifted from one condition to the other, the pressure of the respective styli against the record is changed—being typically less for recording than for reproducing as whenever the recording is effected by a cutting operation. Also, during reproducing the translating device must be universally mounted to have a freedom of movement normal to the record—hereinafter referred to as an up-and-down freedom of movement—and a lateral freedom of movement transverse to the record, but during recording it must be constrained to the up-and-down freedom of movement.

By my invention, the foregoing requirements are fulfilled by means of a novel and improved mechanism for mounting and controlling the translating device.

Objects of my invention are to provide an improved mounting for the translating units of devices of the character mentioned which is simple and inexpensive, readily adjustable to condition the device selectively for recording or reproducing and easily controlled to constrain the device to up-and-down freedom of movement and to reduce the stylus pressure on the record during recording.

A distinctive feature of the mounting which I provide is in pivoting the translating unit to a gimbal on an axis in a plane normal to the record to provide the unit with lateral freedom of movement, and to pivotally support the gimbal on a transverse axis to provide the unit with an up-and-down freedom of movement. By this basic arrangement I am enabled by a simple unitary means to lock the unit against lateral freedom of movement in a centered position during recording, and to vary the stylus pressure on the record as between the recording and reproducing conditions.

A further object is therefore to provide a unitary counterbalancing, centering and locking means for the units of translating devices of the character mentioned.

Another object is to pivot such unitary means to the gimbal member of the mounting mechanism.

A further object is to provide a new and improved means for centering and locking the translating unit with respect to its lateral freedom of movement.

Other objects and features of my invention lie in the details of construction, arrangement of parts and combinations of elements of the embodiment herein shown and described and will be apparent from the following description and the appended claims.

In the description of my invention reference is had to the accompanying drawings, of which:

Figures 1, 2, 3:
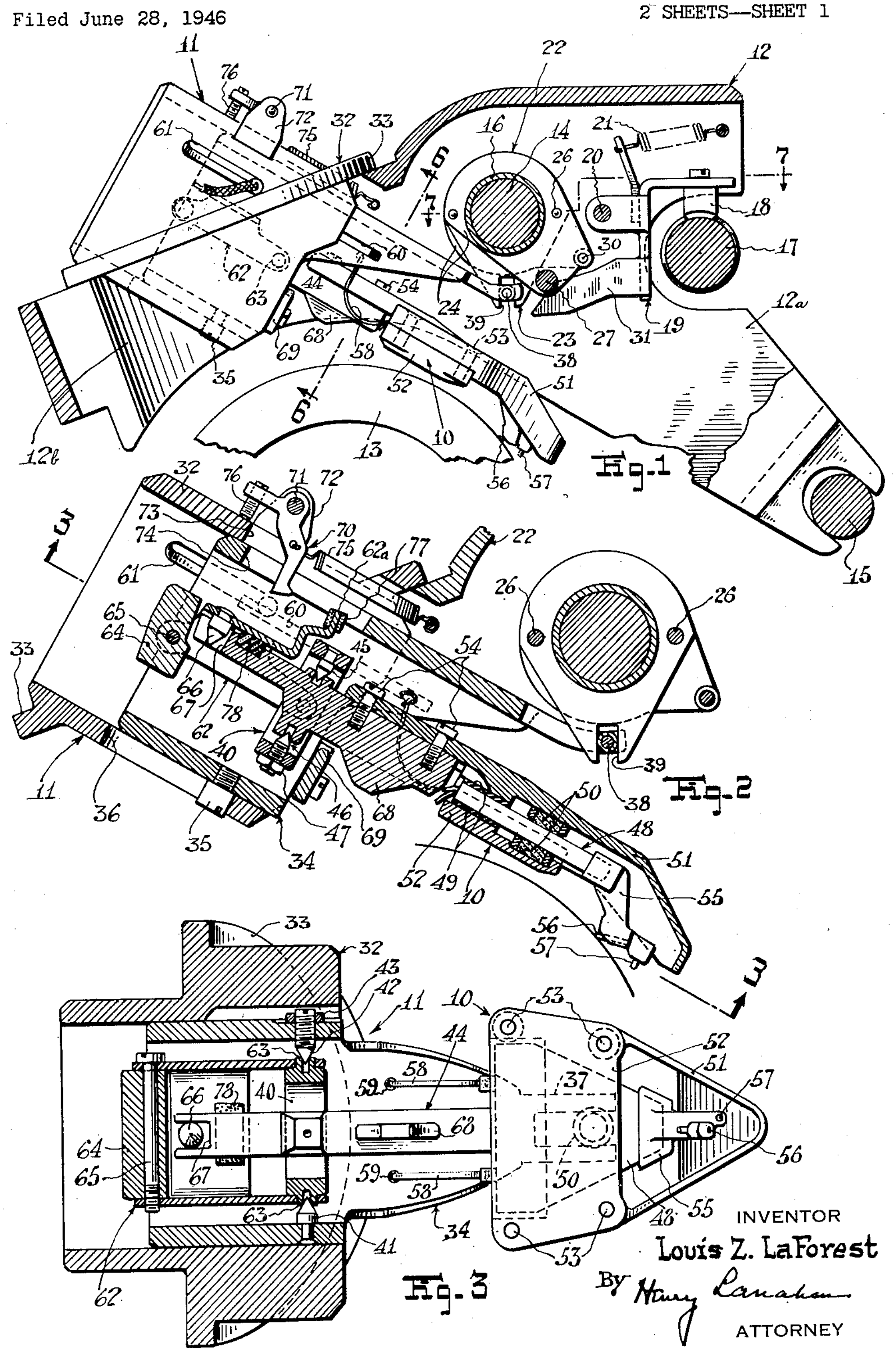
Figure 1 is a side elevational view of a phonographic translating device according to my invention shown supported by a carriage of conventional design, the carriage appearing principally in section on the line 1—1 indicated in Figure 7 and the device being shown in recording condition.
Figure 2 is a section of the translating device, taken substantially on the line 2—2 of Figure 5, and showing the device again in recording condition.
Figure 3 is a bottom view of the translating device with parts in section on the line 3—3 of Figure 2.

In Figure 1 there is shown a translating device including a translating unit 10 and a mounting 11 according to my invention for this unit. The translating device is supported by a carriage 12 which is of a standard form commonly used in dictating machines. The carriage comprises an integral casting having a hollow rearward portion 12a and a forwardly-extending apertured arm 12b which overhangs a cylindrical record 13 and carries the translating device. While my invention is particularly suited for use with records of the cylindrical type, no unnecessary limitation of my invention to such records is intended.

Figures 4, 5, 6, 7, 8:
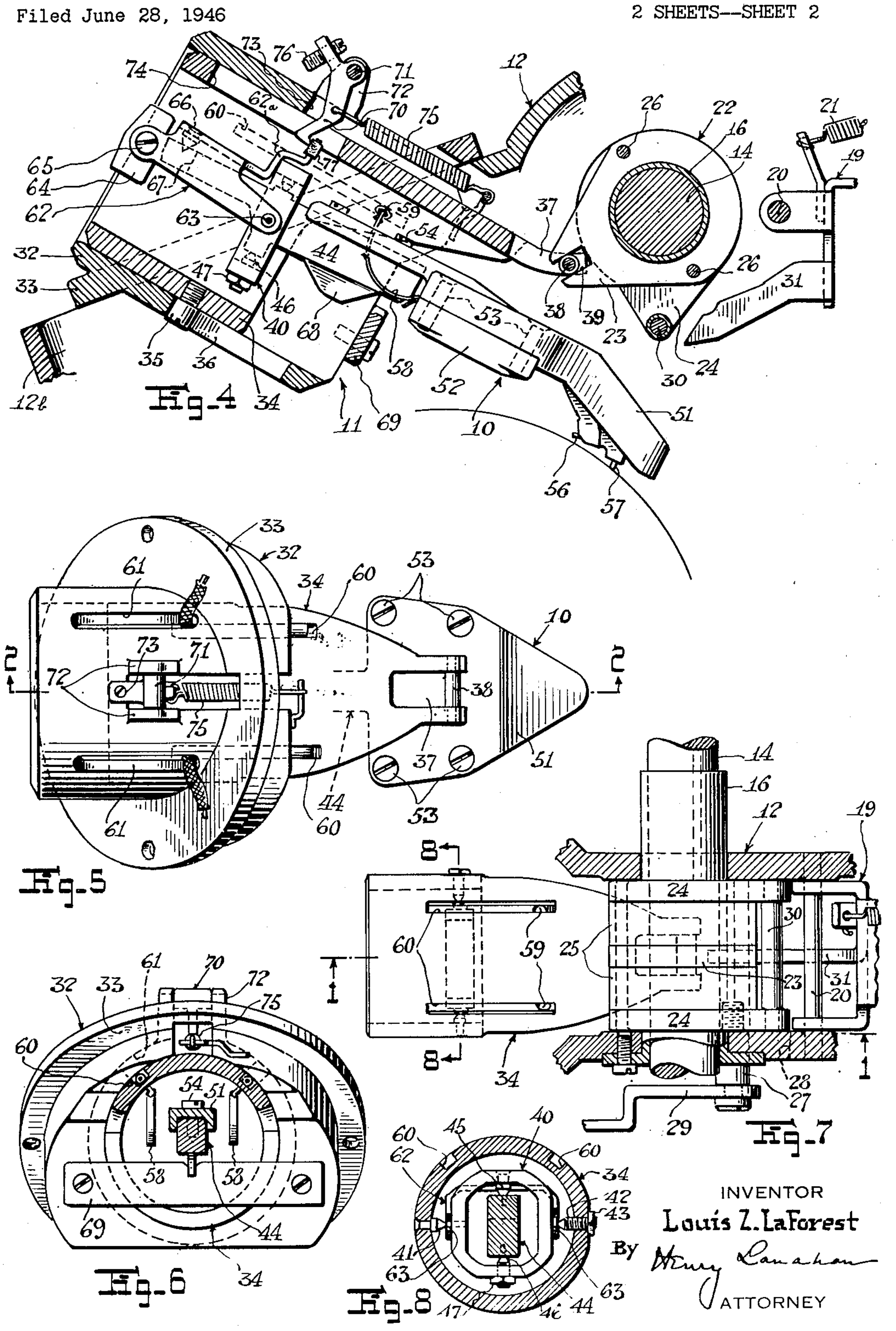
Figure 4 is a view similar to Figure 2 but showing the device in reproducing condition.
Figure 5 is a top plan view of the translating device.
Figure 6 is a fractional sectional taken substantially on the line 6—6 of Figure 1.
Figure 7 is a fractional plan view of the device with parts of the carriage in section on the line 7—7 of Figure 1.
Figure 8 is a fractional section on the line 8—8 of Figure 7.

The rearward portion 12a of the carriage is mounted slidably on two parallel rods 14 and 15 for traveling movement along the axis of the record 13, there being a long sleeve 16 on the carriage between it and the rod 14 so that the carriage has a long bearing surface on this rod (Figure 7). This traveling movement is produced by a feed screw 17 at the rear of the carriage. This screw is coupled to the record so that it is turned as the record is rotated, but such coupling means is not herein necessary to show. Releasably engaging the screw is a feed nut 18 mounted on a rock lever 19 which is pivoted at 20 to the carriage. The rock lever is urged by a spring 21 to hold the feed nut normally in engagement with the feed screw, but may be rocked to disengage the feed nut by turning a cam device 22 that is rotatably mounted on the sleeve 16 within the carriage. This cam device comprises a central collar 23 and two similar end collars 24 spaced from the central collar by two bushings 25, the collars and bushings being secured together by rivets 26. On the right-end collar 24 is a stud 27 which extends through a clearance opening 28 in the right wall of the carriage. Coupled to this stud by a link 29 may be a control lever (not shown) which typically is pivoted to the right side of the carriage arm 12b. The coupling of the cam device to the rock lever comprises a cross pin 30 between the end collars 24 and a cooperating arm 31 on the lever. When the cam device is in a counterclockwise position shown in Figure 1, the pin 30 is free from the arm 31 and the feed nut is held engaged with the feed screw by the spring 21. As the cam device is turned clockwise into a central position the pin 30 engages the arm to release the feed nut, and as the cam device is turned further into a clockwise position the pin 30 is again moved free from the arm and the feed nut is reengaged with the feed screw by the spring 21. The respective positions of the cam device abovementioned are hereinafter referred to as the "recording," "neutral" and "reproducing" positions of this device because it is in these positions that it places the translating device respectively into recording, neutral and reproducing conditions as is hereinafter explained.

The mounting 11 of the translating device comprises a tubular housing 32 provided with an exterior flange 33. This flange seats on the carriage arm 12b and holds the housing in a position wherein it extends partially through the carriage arm in an oblique direction to the record 13. Slidably interiorly mounted in the housing is a tubular frame 34 which is held from turning relative to the housing by the engagement of a key 35 on the frame with a slot 36 in the housing (Figure 2). The upper portion of the frame extends inwardly and terminates below the cam device 22 in a fork 37 which is bridged by a pin 38 (Figures 2 and 5), and in the central collar 23 of the cam device there is a slot 39 engaged by this pin to couple the cam device to the frame. Thus the frame is slid forwardly in the housing as the cam device is turned clockwise from recording to reproducing positions and is slid rearwardly as the cam device is returned.

Within the frame there is a gimbal 40 having approximately a ring shape (Figure 8). This gimbal is pivoted to the frame on a transverse axis substantially parallel to the record surface by two pivots 41 and 42 of which the latter is threaded in the frame so as to be adjustable, it being held in its adjusted position by a lock nut 43. A beam 44 extends centrally through the gimbal and is pivoted thereto on an axis in a plane at right angles to the record surface by two pivots 45 and 46 of which the latter is threaded in the gimbal for adjustment and held in its adjusted position by a lock nut 47. On the inner end of this beam there is mounted the translating unit 10 abovementioned. Purely by way of example, this unit is shown as being of a crystal type comprising a piezo-electric member 48 the intermediate and base portions of which are interposed between two sets of resilient pads 49 and 50. These pads are clamped between a cover element 51 and a base member 52 by four screws 53 which secure the base and cover together. One end of the cover is secured to the beam by screws 54. Mounted on the free end of the piezo-electric member 48 is a stylus holder 55 in which are set a recording stylus 56 and a reproducing stylus 57, the latter being spaced inwardly from the recording stylus in the direction of movement of the frame 34 relative to the housing. Lead wires 58 pass from the piezo-electric member through respective apertures 59 in the frame 34, and through grooves 60 in the frame and next through slots 61 in the housing. In response to the weight of the unit 10, the same is biased towards the record 13.

As so far described it will be understood that the translating unit is universally mounted since it has an up-and-down freedom of movement about the pivots 41 and 42 and a lateral freedom of movement about the pivots 45 and 46. The up-and-down freedom of movement is necessary so that the unit may engage records of different thickness or height and the lateral freedom so that it may track the grooves on the record during reproducing. However, the unit is constrained to up-and-down freedom of movement during recording as is hereinafter described.

Overlying the forward portion of the beam is a bifurcated lever 62 which is pivoted on a fixed transverse axis relative to the frame, preferably on a bearing 63 of the gimbal at the axis of the pivots 41 and 42 (Figure 3). At the outer end of this lever there is secured a counterbalance weight 64 by a screw 65. The lever 62 is thus urged against the beam to reduce the biasing pressure of the unit on the record. Typically, the lever is left to rest on the beam during recording but is held from the beam in a raised position during reproducing so that a lesser stylus pressure is had during recording and a greater pressure during reproducing.

The lever 62 is also adapted so that when it is in engagement with the beam it will center the translating unit with respect to the frame 34 in directions laterally of the record and will lock the unit in that centralized position against lateral freedom of movement. This centering and locking is accomplished by providing the lever 62 with a depending conical pin 66 and the beam 44 with a cooperating slot 67. When the lever 62 is raised the pin is removed from the slot to allow fredom of movement about the pivots 45 and 46 relative to the gimbal. If the lever 62 is released from its raised position while the beam is not centered at the axis of the gimbal, the tip of the pin will engage the side wall of the slot and restore the beam to a centered position and then the shank of the pin will engage the slot and lock the beam to the gimbal against sidewise movement. Since the gimbal is pivoted on a fixed horizontal axis to the frame, locking of the beam to the gimbal has the effect of locking the translating unit against lateral movement.

When the cam device 22 is in recording position the recording stylus 56 engages the record 13 and the lever 62 rests on the beam 44 to reduce the pressure of the stylus on the record and to lock the translating unit from lateral movement relative to the housing 32. When the cam device is turned clockwise to neutral position the frame 34 is moved forwardly in the housing and the translating unit is moved forwardly relative to the record; concurrently a cam 68 at the bottom of the beam 44 engages a cross bar 69 on the inner end of the housing 32 and raises the translating unit from the record. When the cam device is moved further in a clockwise direction to reproducing position the translating unit is moved further forwardly relative to the record and the cam 68 is moved ahead of the bar 69 so as to release the unit so that the reproducing stylus will engage the record. Also, in the forward movement of the translating unit into reproducing position, an upstanding arm **62*a* of the lever 62 is impinged against an abutment 70 to raise the lever 62 from the beam 44 and free the translating unit for lateral movement and to augment the bias of the reproducing stylus against the record. This abutment is preferably a lever pivoted at 71 between two lugs 72 on the housing and extends downwardly through clearance slots 73 and 74 in the housing and frame. This abutment lever is urged rearwardly (Figure 2) by a tension spring 75 into a position defined by the impingement of an adjustable stop 76 on the lever against the top wall of the housing. To prevent a metal clang of parts when the arm 62*a* hits the lever 70 and when the lever 62 is released to engage the beam 44, a rubber tubing 77 is put on the arm 62*a* and a rubber pad 78 is provided on the beam as a stop for the lever 62** (Figure 2).

The present translating device is marked by the simplicity of its structure and the ease with which it is adjusted into recording, neutral and reproducing conditions. These advantages are obtained particularly because the gimbal is pivoted to provide the up-and-down freedom of movement to the translating unit and the unit is pivoted to the gimbal to provide it with a lateral freedom of movement. With this mounting arrangement, the translating unit may be counterbalanced, centered and constrained to up-and-down freedom of movement during recording by a simple unitary means pivoted to the gimbal. Other detailed features and advantages are apparent from the foregoing description.

The embodiment herein particularly shown and described is intended to be illustrative and not necessarily limitative of my invention as the same is subject to changes and modifications without departure from the scope of my invention, which I endeavor to express according to the following claims.

I claim:

1. In a phonographic translating device adapted for selectively recording on or reproducing from a moving record: the combination of a frame, a gimbal member pivotally supported by said frame on a transverse axis substantially parallel to the surface of the record, a translating unit pivoted to said gimbal member on an axis at right angles to said transverse axis, and means for centering said unit relative to said frame in directions laterally of the record and for locking the unit in a centered position comprising a slotted member and a cooperable tapered member, one of said members being fixedly secured to said unit and the other being carried by said frame and mounted for movement in a plane at right angles to said transverse axis.

2. In a phonographic translating device for selectively recording on or reproducing from a moving record: the combination of a beam supported at an intermediate portion thereof for universal movement, a translating unit having recording and reproducing styli and mounted on one end of said beam, said unit being urged towards the record, a counterbalancing and centering means urged against the other end of said beam and adapted when in engagement with the beam to reduce the biasing pressure of the unit against the record and to lock the unit in a centered position from movement laterally of the record, means for moving said styli selectively into engagement with the record to condition said device for recording or reproducing, and means responsive to said moving means as said device is conditioned for reproducing for disengaging said counterbalancing and centering means from said beam.

3. In a translating device for recording on and reproducing from a moving record: the combination of a frame, a gimbal member pivoted to said frame on a transverse axis substantially parallel to the record, a beam pivoted at an intermediate portion thereof to said gimbal member on an axis at right angles to said transverse axis, a translating unit having recording and reproducing styli and mounted on one end of said beam, said unit being urged towards the record, a counterbalance having a stationary transverse pivot axis relative to said frame and held normally in an effective position wherein the same engages the other end of said beam, said other end of the beam being provided with a slot running lengthwise thereof, and a tapered member carried with said counterbalance for engaging said slot to center said device and lock it against lateral freedom of movement when said counterbalance is in its effective position.

4. The combination set forth in claim 3 including a housing movably supporting said frame, means for moving said frame relative to said housing to condition said device for recording and reproducing, and means carried by said housing and operated as said frame is moved to condition said device for reproducing for moving said counterbalance from said beam into an ineffective position.

5. In a translating device for recording on and reproducing from a moving record: the combination of a frame, a gimbal member pivoted to said frame on a transverse axis substantially parallel to the engaged surface of the record, a beam pivoted at an intermediate portion thereof to said gimbal member on an axis at right angles to said transverse axis, a translating unit mounted on one end of said beam and biased towards the record, said unit having recording and reproducing styli spaced from one another in the directions of movement of said frame, a lever pivoted to said gimbal member at said transverse axis, said lever being adapted to engage the other end of said beam to center said device laterally of the record and lock it in relation to said gimbal member, means for moving said frame to selectively engage said styli with the record, and means responsive to said moving means as the frame is moved to engage said recording and reproducing styli with the record for respectively engaging said lever with and disengaging it from said beam.

6. In a translating device for recording on and reproducing from a moving record: the combination of a carriage moved progressively along the record, a housing mounted on said carriage, a frame slidably mounted in said housing for oblique movement relative to the record, a gimbal member in said frame and pivoted thereto on a transverse axis substantially parallel to the engaged surface of the record, a beam passing through said gimbal member, said beam being pivoted at an intermediate portion thereof to said gimbal member on an axis in a plane at right angles to the engaged surface of the record, a translating unit mounted on one end of said beam and biased towards the record, said unit including recording and reproducing styli, a counterbalance overlying the other end of said beam and pivoted to said gimbal member, said other end of said beam having a slot therein and said counterbalance including a tapered member for engaging said slot to center said unit and lock it against sidewise movement relative to the record, and means responsive to said moving means as said reproducing stylus is engaged with the record for raising said counterbalance from said beam to free said unit for lateral movement and to augment the bias of the unit against the record.

LOUIS Z. LA FOREST.

REFERENCES CITED

The following references are of record in the file of this patent:

UNITED STATES PATENTS

| Number | Name | Date |
|---|---|---|
| 1,067,530 | Lindstrom | July 15, 1913 |
| 1,093,732 | Scully | Apr. 21, 1914 |
| 1,283,771 | Holland | Nov. 5, 1918 |
| 1,744,047 | Keller | Jan. 21, 1930 |
| 2,016,505 | Lucarelle | Oct. 8, 1935 |
| 2,069,136 | Durand et al. | Jan. 26, 1937 |
| 2,266,781 | Lucarelle et al. | Dec. 23, 1941 |
| 2,446,324 | Di Ghilini | Aug. 3, 1948 |